Jan. 21, 1941.                F. E. PRICE                2,229,591
VEHICLE CONTROL UNIT
Filed April 9, 1938
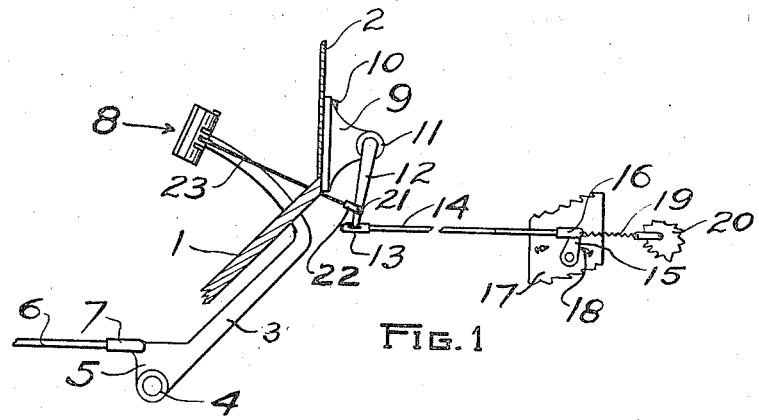
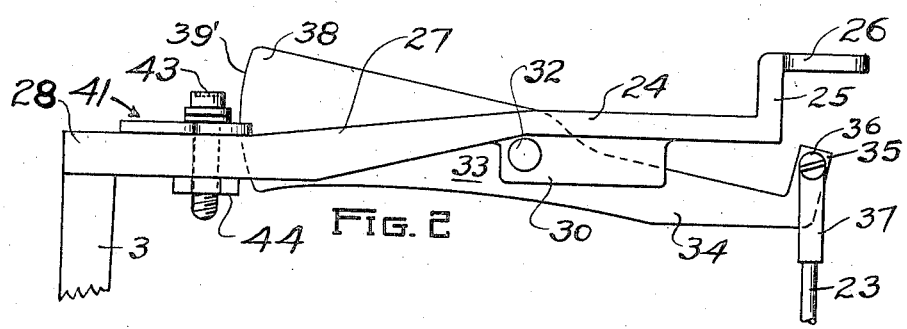
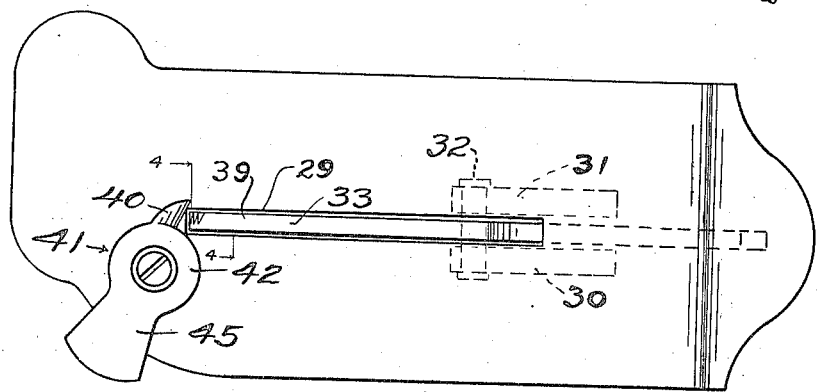
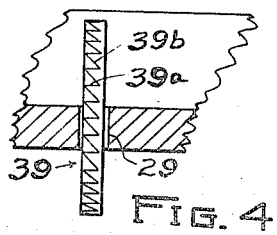
INVENTOR
FRANK E. PRICE
Earl E. Moore
ATTY.

Patented Jan. 21, 1941

2,229,591

UNITED STATES PATENT OFFICE 2,229,591

VEHICLE CONTROL UNIT

Frank E. Price, Pasadena, Calif.

Application April 9, 1938, Serial No. 201,124

10 Claims. (Cl. 192—3)

This invention relates to a new combination for the control of a motor vehicle in that means are provided for applying the brake of the vehicle in combination with means for controlling the power of its motor. The means comprises a single unit control in which the engine accelerator is incorporated in the foot control of the braking system. The well known foot accelerator for motor cars is combined with the foot pedal for operating the brakes in such a manner that the fuel is fed to the engine by applying foot pressure to the accelerator portion of the unit; and by applying greater pressure in the same direction, the braking system of the vehicle is brought into action. By pressing upon the unit in a single direction so as to apply the brakes, the accelerator is automatically set for an engine idling speed.

In operating the accelerator-brake unit of this invention, it is not necessary to remove the foot from the unit at any time while driving the car, and since only a single directional motion of the foot is necessary for increasing the speed of the vehicle or for slowing down the vehicle, there is less likelihood that the driver will lose control of the car as in the use of present equipment for controlling the operation of cars.

This invention makes driving of motor cars much safer for driver and pedestrian because of the fact that there is no loss of time in decelerating the engine and applying the brakes as in the conventional equipped car. In present cars, the right foot must be moved from the foot accelerator to the brake pedal when an emergency stop is necessary. The operator of the automobile having this invention need not remove his foot from the brake-accelerator control unit at any time, but may, however, if desired, as on long drives, on highways or where traffic is light and intersections far apart set the accelerator for a certain engine speed and then remove the foot. The unit is provided with a quickly releasable latch means so that the accelerator can be set at a predetermined point for a certain speed and the foot then removed entirely from the pedal. In such a case, however, should it become necessary to make a quick stop or to slow the vehicle down, the operator need only apply pressure to the unit to slow the vehicle or to bring it to a stop without changing the setting of the accelerator. This latching device has particular use where the operator anticipates that there will be very little road interferences or perhaps an occasional use of the brake for slowing down the movement of the vehicle. Should the operator desire to release or reset the accelerator without disturbing the pedal position, he need only kick the latch and thus place the unit in condition for normal use, but, however, it is now apparent from the disclosure herein, that sufficient pressure upon the accelerator will cause it to release from the latch because of the cam-like teeth 39b.

An object of this invention is to present a unit control for a motor vehicle which regulates the fuel supply to the motor and controls the application of the brakes.

Another object is to provide a single control unit for a motor vehicle which either applies the brakes of the vehicle or increases its speed by pressure upon the unit.

A further object is to provide a control means for a motor vehicle which has two functions: to regulate the amount of fuel fed to the motor and the application or release of the vehicle brakes; pressure in one direction upon the unit either accelerates the engine or applies the brakes, whereas negative pressure upon the unit either decelerates the engine or releases the brakes or both.

Other objects, advantages and features of my invention will appear from the accompanying drawing, the subjoined detailed description, the preamble of these specifications and the appended claims.

In the drawing:

Fig. 1 shows an elevation of a part of a motor vehicle, some parts being shown in section.

Fig. 2 shows an elevation of the principal part of the invention.

Fig. 3 shows a plan view of the invention.

Fig. 4 shows a detail part of the invention.

Applicant has illustrated and is about to describe one of the forms of his invention in order to teach one how to make, use and vend the same, but it is to be understood that the drawing and description thereof are not to limit the invention in any sense, whatsoever, except as limited by the appended claims.

The numeral 1 represents the well known toe board of an automobile having the upper end thereof fixed to the well known partition 2 which divides the motor compartment from the tonneau of an automobile. The brake lever is indicated by 3 which is journalled upon the shaft 4 and has an eccentric portion 5 to which is pivoted the brake rod 6 by means of the well known spring knuckle connector 7. The brake lever 3 is configurated as shown, and has at its upper end a treadle 8 which is an important part of this invention, and will be described in detail.

Upon the engine side of the partition 2 is mounted a bearing bracket 9 fixed to the partition by any suitable means such as by bolts 10, which provides a bearing 11 for one end of a lever 12. The other end of the lever has a protrusion which connects with the well known connecting knuckle 13. The knuckle is screwed to one end of a rod 14 which connects to the upper end of a butterfly valve lever 15 through the medium of a connecting knuckle 16. The lever 15 controls the fuel supply to the engine through the down draft tube 17 and when the lever 15 is in an engine idling position, it is held against the stop 18.

A spring 19 is fixed to one end of the knuckle 16 and to any frame member or motor part 20 which may be convenient for the purpose. At about the point 21 upon the lever 12 is pivoted a bifurcated connector 22 which is fixed to a flexible wire or cable 23 leading to the pedal assembly 8.

The pedal assembly comprises a main foot treadle element 24 having integral therewith a skid stop for the foot as indicated at 25 which has a substantially horizontal dress plate 26. The treadle is configurated as shown in the drawing and has a declined portion 27 which increases in thickness to form a strong and substantially horizontal end section 28. This end section is fixed to the upper end of the brake pedal 3 in any suitable manner when the pedal is installed in cars already constructed, but it is preferably an integral part of the lever 3 as shown in the drawing. The top surfaces of the element 24 and section 28 present substantially horizontal planes at different levels connected by the top surface of portion 27 which is an inclined plane. This offset relation of the horizontal planes is of great importance and which will become apparent upon further description of the invention.

The treadle is provided with an elongated slot 29 and beneath the section 24 is provided with bosses 30 and 31 which are punched or perforated as shown to support a spindle 32 having its ends flattened so as to remain in place. Upon the spindle is mounted a gas accelerator 33 in a manner to permit free movement thereof at right angles to the spindle.

One end of the accelerator is narrowed as at 34 and is provided with an angled protrusion 35 having a threaded perforation therethrough to receive a screw 36 in threaded engagement therewith. The screw is a pivot for a bifurcated wire connector 37 for joining the wire 23 pivotally with the end 35 of the accelerator. The other end of the accelerator 38 is materially enlarged and is designed to reciprocate through the slot 29 of the treadle. The enlarged end 37 is provided with a cam-like rack portion 39 designed and configurated to receive a wedge-shaped finger 40 or pawl of a latching device 41. The latching device has a rounded section 42 which is perforated through its center to receive a screw 43 which pivotally holds the latching device to the treadle as by the nut 44. The end of the latching device opposite the finger 40 is provided with a kick lever 45 which extends beyond the confines of the treadle so that it can be kicked by the driver's foot and thus force the finger 40 into engagement with the cam-like rack 39.

The cam-like rack 39 has the general contour of a circle segment. The teeth of the rack comprise portions 39a normal to the perimeter 39' of the segment and portions 39b forming an angle therewith of about 45 degrees or greater. The portions 39a are parallel with the bottom of the latch finger 40 and the portions 39b are parallel with the bevelled side of the finger. By this arrangement, pressure upon the end 38 of the accelerator will force the latch out of engagement with the rack so that the accelerator can be used in the usual and ordinary manner whereas when no such pressure is employed, the accelerator will be held in a certain predetermined position by the finger 40.

*Operation*

When the engine is in an idling condition, the throttle is set as shown at 15 and the accelerator 33 is set as shown in Fig. 2. When it is desired to increase the speed of the engine, the accelerator 33 is pressed downwardly and for normal driving conditions, the top edge thereof is generally flush with the high level portion 24 of the brake pedal (note Fig. 2). However, when higher speeds are desired the top edge of the accelerator will approach parallelism with the slanted portion 27 of the brake pedal. These parts are so arranged in order to give the driver foot comfort, and also to keep the driver's foot on a substantial portion of the brake pedal so that in case of emergency, the brake can be immediately applied.

Whenever the brake pedal is depressed, either slowly or fast, the flexible wire 23 will relax immediately and allow the spring 19 to position the throttle 15 to an engine idling position. When the brake pedal is again returned to a "brake-off" position, the accelerator will then be in the position shown in Fig. 2.

On long journeys, it is desirable by some drivers to set the accelerator so as to maintain a certain car speed. This is accomplished in applicant's invention by depressing the accelerator to the desired car speed, and kicking the latch 41 so that the dog 40 will engage the teeth 39 which will hold the accelerator in the position desired. However, when the brakes must be applied for slowing down the car, or for other purposes, the pedal need only be depressed, in which event, the wire 23 will relax. Whenever the brake pedal is released, the accelerator will again be in its same position so as to maintain the same car speed that existed before the pedal was depressed. Should the driver wish to return the accelerator to an unlocked or unlatched position, he need only apply quick foot pressure to the accelerator in order to cause the beveled portion 39b of the teeth to eject the dog 40 and cause its disengagement.

Having thus described my invention, what is claimed as new and desired to be secured by Letters Patent is:

1. In a motor vehicle control device, a brake control pedal, an accelerator pedal mounted thereon, flexible means for connecting said accelerator pedal to the carburetor throttle control lever, such flexible means being so disposed that forward motion of the brake pedal causes a slackening of said flexible means and allows the throttle to close itself as the brake is applied, an elongated slot lengthwise of the control pedal and said accelerator pedal extending through the slot for movement therethrough, said control pedal having low and high level portions, the upper edge of the accelerator pedal being substantially flush with the high level of the control pedal at its mean position.

2. In a motor vehicle control device, in combination with a brake control pedal and an accelerator pedel, flexible means connecting said accelerator pedal to the carburetor throttle lever, said means being so disposed that forward motion of the brake pedal removes pulling tension on said means, thereby allowing the throttle to close simultaneously as the brake is applied, regardless of the "open" or "closed" position of the said accelerator, an elongated slot lengthwise of the control pedal and said accelerator pedal extending through the slot for movement therethrough, said control pedal having low and high level portions, the upper edge of the accelerator pedal being substantially flush with the high level of the control pedal at its mean position.

3. In a motor vehicle control device, a brake control pedal and accelerator combined therewith, means for securing the accelerator pedal in an open position so that forward motion of the brake pedal tends to apply the brake and close the throttle, whereas backward motion, or return of the brake pedal, tends to release the brake and open the throttle.

4. In a unit for controlling the carburetor valve and brakes of a motor vehicle, a foot pedal for operating the brakes, a foot accelerator pivotally supported by and within the confines of the pedal, flexible means connecting the accelerator with the valve and resilient means for urging the valve to a motor idling position, said accelerator having notches along one edge thereof and adapted to be engaged by a pawl.

5. In a unit for controlling the carburetor valve and brakes of a motor vehicle, a foot pedal for operating the brakes, a foot accelerator pivotally supported by and within the confines of the pedal, said pedal having an elongated slot therein, said accelerator being pivoted so as to swing through the slot, a spring for urging the accelerator to stand upwardly through the slot, said accelerator having notches along one edge thereof, a latching device having a pawl for engaging any notch in alinement therewith.

6. In a unit for controlling the carburetor valve and brakes of a motor vehicle, a foot pedal for operating the brakes, a foot accelerator pivotally supported by and within the confines of the pedal, said pedal having an elongated slot therein, said accelerator being pivoted so as to swing through the slot, a spring for urging the accelerator to stand upwardly through the slot, notches along one end of the accelerator, a latching device having means to engage any notch in alinement therewith, said means being provided with a kick lever so that the pawl can be forced into engagement with any notch which happens to be in position to receive it.

7. In a unit for controlling the carburetor valve and brakes of a motor vehicle, a foot pedal for operating the brakes, a foot accelerator pivotally supported by and within the confines of the pedal, said pedal having an elongated slot therein, said accelerator being pivoted so as to swing through the slot, a spring for urging the accelerator to stand upwardly through the slot, said accelerator having notches along one edge thereof, a latching device having a pawl for engaging any notch in alinement therewith, said notches being arranged so that when engaged by the pawl, a predetermined pressure upon the accelerator will release or unlatch the accelerator.

8. In a combined brake and accelerator device for a vehicle, a pedal for controlling the brakes of the vehicle having a floor or foot accommodating section, means in the floor of the pedal making provision to receive the accelerator so that the accelerator can be reciprocated through the floor, said section having a high and low level, said high level being substantially flush with the top of the device when it is at a substantially mean position.

9. In a motor vehicle control device, a brake pedal having two planes connected by an inclined plane, an elongated slot in the pedal having its major length in the inclined plane, an accelerator lever pivoted intermediate its ends to the high end of the slot so that one end of the lever can be reciprocated through the slot, means connecting the lever with a fuel supply valve.

10. In a unit for controlling the carburetor valve and brakes of a motor vehicle, a foot pedal for operating the brakes, a foot accelerator pivotally supported by and within the confines of the pedal, said accelerator having a series of cam-like notches at one end to be engaged by a pawl so that the accelerator can be latched in certain predetermined positions.

FRANK E. PRICE.